(12) United States Patent
Shirono et al.

(10) Patent No.: US 7,582,373 B2
(45) Date of Patent: Sep. 1, 2009

(54) ELECTROLYTE FILM AND FUEL CELL

(75) Inventors: Katsuhiro Shirono, Fukuoka (JP);
Tsuguo Koyanagi, Fukuoka (JP);
Michio Komatsu, Fukuoka (JP)

(73) Assignee: JGC Catalysts and Chemicals Ltd. (JP)

( * ) Notice: Subject to any disclaimer, the term of this patent is extended or adjusted under 35 U.S.C. 154(b) by 880 days.

(21) Appl. No.: 10/495,371

(22) PCT Filed: Nov. 8, 2002

(86) PCT No.: PCT/JP02/11678

§ 371 (c)(1),
(2), (4) Date: May 12, 2004

(87) PCT Pub. No.: WO03/043029

PCT Pub. Date: May 22, 2003

(65) Prior Publication Data

US 2005/0031924 A1 Feb. 10, 2005

(30) Foreign Application Priority Data

Nov. 15, 2001 (JP) ............................. 2001-350596
Nov. 15, 2001 (JP) ............................. 2001-350597

(51) Int. Cl.
*H01M 8/10* (2006.01)
(52) U.S. Cl. .......................................... 429/30; 429/33
(58) Field of Classification Search .................. 429/30, 429/33
See application file for complete search history.

(56) References Cited

U.S. PATENT DOCUMENTS 5,643,665 A * 7/1997 Saidi ........................ 428/330
5,985,486 A 11/1999 Giron
6,059,943 A 5/2000 Murphy et al.

FOREIGN PATENT DOCUMENTS

| EP | 0 831 360 A1 | 3/1998 |
|---|---|---|
| JP | 0421963 B2 | 4/1992 |
| JP | 06-103983 A | 4/1994 |
| JP | 06-275301 A | 9/1994 |
| JP | 07116252 A | 5/1995 |
| JP | 10-040737 A | 2/1998 |
| JP | 10-199559 A | 7/1998 |
| JP | 2000-265235 A | 9/2000 |
| JP | 2001035509 A | 2/2001 |
| JP | 2001-143723 A | 5/2001 |

OTHER PUBLICATIONS

Guo et al. "Synthesis of novel Sb2O3 and Sb2O5 nanorods" Chem Phys. Let., 2000, 318, 49.*

* cited by examiner

*Primary Examiner*—Patrick Ryan
*Assistant Examiner*—Muhammad Siddiquee
(74) *Attorney, Agent, or Firm*—The Webb Law Firm

(57) ABSTRACT

An electrolyte membrane includes inorganic oxide particles having proton conductivity, and an organic resin or an inorganic matrix component. The inorganic oxide particles having proton conductivity preferably comprise hydrated antimony oxide particles represented by the following formula (1) and have an average particle diameter of 5 to 50 nm, and the content of the hydrated antimony oxide particles is preferably in the range of 5 to 80% by weight in terms of an oxide ($Sb_2O_5$);

$$Sb_2O_5 \cdot nH_2O \qquad (1)$$

wherein n is 0.1 to 5. The electrolyte membrane provides a fuel cell which exhibits high cell performance even after prolonged operation and/or at high operating temperatures.

11 Claims, No Drawings

ELECTROLYTE FILM AND FUEL CELL

BACKGROUND OF THE INVENTION

1. Field of the Invention

The present invention relates to electrolyte membranes and fuel cells using the electrolyte membranes. More particularly, the invention relates to electrolyte membranes for fuel cells which can maintain a high voltage in a prolonged operation and/or an operation at high temperature and have excellent stability, and fuel cells using the electrolyte membranes.

2. Description of the Prior Art

As electric generating systems using clean hydrogen as the energy source, having high efficiency, causing no pollution and generating no warming gas such as $CO_2$, fuel cells have recently received attention. Regarding such fuel cells, development research has been earnestly undertaken for the purpose of using the fuel cells as fixed equipment in homes or business places and as mobile equipment in automobiles.

Fuel cells are classified according to types of electrolyte membranes used therein, and they are divided into alkali electrolyte membrane type, solid polymer electrolyte membrane type, phosphoric acid type, molten carbonate type and solid electrolyte membrane type. In the solid polymer electrolyte membrane type and the phosphoric acid type, the charge exchange substance is a proton, so that the fuel cells of these types are also referred to as "proton exchange membrane fuel cells".

Examples of fuels used for the fuel cells include hydrocarbon fuels, such as natural gas, LP gas, city gas, alcohol, gasoline, kerosine and gas oil.

The above hydrocarbon fuel is first converted into a hydrogen gas and a CO gas by a reaction such as steam reforming or partial oxidation, and the CO gas is removed to obtain a hydrogen gas. The hydrogen is fed to an anode and dissociates into protons (hydrogen ions) and electrons by the function of a metal catalyst of the anode. The electrons flow to a cathode through a circuit with doing work, while the protons (hydrogen ions) diffuse into an electrolyte membrane and flow to a cathode. At the cathode, water is produced from the electrons, the hydrogen ions and oxygen fed to the cathode, and the water diffuses into the electrolyte membrane. That is to say, the fuel cells utilize a mechanism to draw electric current during the production process of water from oxygen and hydrogen derived from a fuel gas.

Examples of the electrolyte membranes used for such fuel cells include a cation-exchange membrane which is based on polystyrene and has sulfonic acid group, a mixed membrane of fluorocarbon sulfonic acid and polyvinylidene fluoride, a membrane wherein trifluoroethylene is grafted on a fluorocarbon matrix, and a perfluorocarbon sulfonic acid membrane.

However, migration of protons through the electrolyte membrane comprising such an organic resin membrane, namely, ionic conductance of the membrane, depends upon a water content in the membrane. When a prolonged operation is carried out or a high-temperature operation at a temperature of about 80° C. or higher is carried out, the water content in the membrane is lowered, and as a result, ionic conductance is lowered to cause reduction of an output voltage.

On this account, Japanese Patent Laid-Open Publication No. 103983/1994 proposes a solid polymer electrolyte membrane fuel cell in which a compound having a phosphoric acid group is contained in a polymer membrane to allow the polymer membrane to exhibit excellent water retention properties and thereby which can be favorably employed at an operating temperature of 80° C. or higher.

In Japanese Patent Laid-Open Publication No. 143723/2001, an electrolyte membrane comprising an amorphous silica molded product containing phosphorus pentoxide is disclosed as an electrolyte membrane for a fuel cell favorably employable at an operating temperature of 80° C. or higher.

However, when the solid polymer electrolyte membranes thus proposed are used for a long period of time at a high temperature of 100° C. or higher, the water content in the membrane is lowered because of high temperature, or in case of an electrolyte membrane using a resin, proton conductivity is lowered by deterioration of the resin component to thereby reduce a voltage, resulting in a problem of lowering of cell performance.

OBJECT OF THE INVENTION

It is an object of the present invention to provide an electrolyte membrane capable of providing a fuel cell which can maintain a high voltage even in a prolonged operation or an operation at high temperature and has excellent stability. It is another object of the present invention to provide an electrolyte membrane capable of providing a fuel cell which exhibits high cell performance even when it is used in a prolonged operation or a high-temperature operation.

SUMMARY OF THE INVENTION

The present inventors have earnestly studied means to enhance cell performance in the use of a fuel cell for a long period of time under the high-temperature conditions. As a result, the present inventors have found that antimony oxide particles have high proton conductivity and exhibit high water retention properties at high temperatures and that by the use of these antimony oxide particles for an electrolyte membrane together with an organic resin or an inorganic matrix component, a fuel cell which exhibits high cell performance even when it is used for a long period of time and/or at a high temperature is obtained. Based on the finding, the present invention has been accomplished.

An electrolyte membrane according to the present invention comprises inorganic oxide particles having proton conductivity and a matrix component.

The inorganic oxide particles having proton conductivity preferably comprise hydrated antimony oxide particles represented by the following formula (1) and have an average particle diameter of 5 to 50 nm, and the content of the hydrated antimony oxide particles is preferably in the range of 5 to 80% by weight in terms of an oxide ($Sb_2O_5$);

$$Sb_2O_5 \cdot nH_2O \qquad (1)$$

wherein n is 0.1 to 5.

The matrix component preferably comprises an organic resin, and the organic resin is particularly preferably at least one organic resin selected from the group consisting of a cation-exchange resin based on polystyrene, a mixture of fluorocarbon sulfonic acid and polyvinylidene fluoride, a graft copolymer wherein trifluoroethylene is grafted on a fluorocarbon matrix, a perfluorocarbon sulfonic acid resin, a vinylidene fluoride resin, a 2-dichloroethylene resin, a polyethylene resin, a vinyl chloride resin, an ABS resin, an AS resin, a polycarbonate resin, a polyamide resin, a polyimide resin and a methacrylic resin.

The matrix component is preferably an inorganic matrix component, and the inorganic matrix component particularly preferably comprises at least one inorganic oxide selected from the group consisting of $ZrO_2$, $SiO_2$, $TiO_2$ and $Al_2O_3$.

The fuel cell according to the present invention uses the electrolyte membrane.

DETAILED DESCRIPTION OF THE INVENTION

The electrolyte membrane and the fuel cell according to the present invention are described in detail hereinafter.

<Electrolyte Membrane>

The electrolyte membrane of the invention comprises inorganic oxide particles having proton conductivity and a matrix component.

<Inorganic Oxide Particles Having Proton Conductivity>

Examples of the inorganic oxide particles having proton conductivity for use in the invention include antimony oxide particles, heteropolyacids, such as tungstic acid, stannic acid and molybdic acid, crystalline aluminosilicates into which rare earth ions have been incorporated, and porous crystalline aluminum phosphate.

The inorganic oxide particles need to have high water retention properties, and they are preferably hydrated antimony oxide particles.

The hydrated antimony oxide particles having proton conductivity preferably used in the invention are particles of a hydrate of antimony oxide and represented by the following formula (1) (except mere adhesive water that is not crystallization water):

$$Sb_2O_5 \cdot nH_2O \tag{1}$$

wherein n is 0.1 to 5.

The antimony oxide particles have proton conductivity, and they are added for the purpose of enhancing conductivity of the electrolyte membrane.

The hydrated antimony oxide particles have an average particle diameter of preferably 5 to 50 nm, more preferably 5 to 25 nm. If the average particle diameter is less than 5 nm, powder resistivity (volume resistivity) sometimes exceeds $10^{10}$ Ω·cm. On this account, cation conductivity is low and a sufficient output voltage is not obtained occasionally. If the average particle diameter exceeds the upper limit of the above range, the hydrated antimony oxide particles cannot be sufficiently introduced into the electrolyte membrane in some cases though it depends upon the process for producing the electrolyte membrane, and even if they are introduced, strength of the resulting electrolyte membrane sometimes becomes insufficient.

The water content in the hydrated antimony oxide particles, as measured after drying at 100° C. for 1 hour, is in the range of preferably about 0.5 to 22% by weight, more preferably 2 to 22% by weight.

The water content in the hydrated antimony oxide particles, as measured after drying at 200° C., is in the range of preferably about 0.25 to 10% by weight, more preferably 0.5 to 10% by weight.

If the water content in the hydrated antimony oxide particles, as measured after drying at 200° C., is less than 0.25% by weight, an effect of use of the hydrated antimony oxide particles as the proton-conductive inorganic particles is not obtained, and when a high-temperature operation and/or a prolonged operation is carried out, voltage tends to be reduced to deteriorate cell performance.

It is difficult to obtain hydrated antimony oxide particles having a water content, as measured after drying at 200° C., of more than 10% by weight.

The hydrated antimony oxide particles for use in the invention do not need to have a water content in the above range during the preparation of the electrolyte membrane, and the water content may be adjusted to be in the above range by subjecting the electrolyte membrane to moistening treatment or the like after the electrolyte membrane has been prepared.

The hydrated antimony oxide particles for use in the invention have a powder resistivity (volume resistivity) of preferably less than $10^{10}$ Ω·cm, more preferably less than $10^7$ Ω·cm.

If the volume resistivity of the conductive oxide particles exceeds the upper limit of the above range, an effect that the electrical resistance is kept low becomes insufficient and a sufficient output voltage cannot be obtained in some cases, though it depends upon the content of the particles in the electrolyte membrane.

<Matrix Component>

The matrix component for use in the invention is an organic resin or an inorganic matrix component.

(Organic Resin)

The organic resin is not specifically restricted provided that it is employable for an electrolyte membrane. For example, the organic resin is preferably at least one organic resin selected from the group consisting of a cation-exchange resin based on polystyrene having a sulfonic acid group, a mixture of fluorocarbon sulfonic acid and polyvinylidene fluoride, a graft copolymer wherein trifluoroethylene is grafted on a fluorocarbon matrix, a perfluorocarbon sulfonic acid resin, a vinylidene fluoride resin, a 2-dichloroethylene resin, a polyethylene resin, a vinyl chloride resin, an ABS resin, an AS resin, a polycarbonate resin, a polyamide resin, a polyimide resin and a methacrylic resin.

As such organic resins, resins exemplified in, for example, Japanese Patent Laid-Open publication No. 275301/1994, Japanese Patent Laid-Open Publication No. 199559/1998, Japanese Patent Laid-Open Publication No. 40737/1998 and Japanese Patent Laid-Open Publication No. 103983/1994 are employable.

(Inorganic Matrix Component)

The inorganic matrix component is decomposed at high temperatures and preferably comprises at least one inorganic oxide selected from the group consisting of $ZrO_2$, $SiO_2$, $TiO_2$ and $Al_2O_3$.

By the use of such an inorganic matrix component, an electrolyte membrane that is porous, excellent in membrane strength and water retention properties, and excellent in heat stability and durability, is obtained.

As the inorganic matrix component, a metallic salt of Zr, Si, Ti or Al and/or a hydrolysis-polycondensation product of an organometallic compound of Zr, Si, Ti or Al is preferable.

Examples of the metallic salts include chlorides, sulfates and nitrates.

Examples of the organometallic compounds include a silicic acid solution, alkoxysilane, zirconium tetrabutoxide, silicon tetrapropoxide, titanium tetrapropoxide, and hydrolysates of these compounds.

The inorganic matrix component may be one formed from a conventional sol, such as a $ZrO_2$ sol, a $SiO_2$ sol, a $TiO_2$ sol, an $Al_2O_3$ sol or a $SiO_2 \cdot Al_2O_3$ composite sol.

Of the above inorganic matrix components, a component comprising silica is preferable, and a component formed from a silicic acid solution obtained by dealkalizing an alkali metal silicate aqueous solution or an organosilicon compound represented by the following formula (2), such as alkoxysilane, is particularly preferable in the invention.

$$R_a Si(OR')_{4-a} \tag{2}$$

In the above formula, R is a vinyl group, an aryl group, an acrylic group, an alkyl group of 1 to 8 carbon atoms, a hydrogen atom or a halogen atom, R' is a vinyl group, an aryl group, an acrylic group, an alkyl group of 1 to 8 carbon atoms, —$C_2H_4OC_nH_{2n+1}$ (n=1 to 4) or a hydrogen atom, and a is an integer of 0 to 3.

Examples of such alkoxysilanes include tetramethoxysilane, tetraethoxysilane, tetraisopropoxysilane, tetrabutoxysilane, tetraoctylsilane, methyltrimethoxysilane, methyltriethoxysilane, ethyltriethoxysilane, methyltriisopropoxysilane, vinyltrimethoxysilane, phenyltrimethoxysilane and dimethyldimethoxysilane.

<Electrolyte Membrane>

The electrolyte membrane of the invention comprises the inorganic oxide particles having proton conductivity, and the organic resin or the inorganic matrix component. The electrolyte membrane comprising the inorganic oxide particles having proton conductivity and the organic resin is also referred to as a "solid polymer electrolyte membrane", and the electrolyte membrane comprising the inorganic oxide particles having proton conductivity and the inorganic matrix component is also referred to as an "inorganic electrolyte membrane".

(Solid Polymer Electrolyte Membrane)

In the solid polymer electrolyte membrane, the inorganic oxide particles having proton conductivity are contained in the amount of preferably 5 to 80% by weight, more preferably 10 to 50% by weight, in terms of an oxide.

When the content of the inorganic oxide particles having proton conductivity is in the above range, the solid polymer electrolyte membrane has high proton conductivity and has high water retention properties at high temperatures. Hence, a fuel cell that exhibits high cell performance even when it is used for a long period of time or at a high temperature can be obtained. If the inorganic oxide particles having proton conductivity are contained in an amount lower than the lower limit of the above range, an effect of use of the particles sometimes becomes insufficient. It is difficult to produce a solid polymer electrolyte membrane containing the inorganic oxide particles having proton conductivity in an amount exceeding the upper limit of the above range, and even if such a solid polymer electrolyte membrane can be produced, strength of the membrane sometimes becomes insufficient.

The solid polymer electrolyte membrane of invention is obtained by substantially adhering (supporting) or introducing the proton-conductive inorganic oxide particles into a membrane comprising the organic resin. On this account, the organic resin membrane is desirably porous and desirably has a porosity of not less than 5%, preferably not less than 10%.

(Process for Producing Solid Polymer Electrolyte Membrane)

There is no specific limitation on the process for producing the solid polymer electrolyte membrane of the invention, provided that the inorganic oxide particles having proton conductivity can be adhered (supported) onto or introduced into the organic resin membrane. For example, the organic resin membrane is immersed in a dispersion of the inorganic oxide particles having proton conductivity to introduce the inorganic oxide particles into pores of the organic resin membrane and then dried to obtain the solid polymer electrolyte membrane. The operations of immersion and drying may be repeated when needed, whereby the amount of the proton-conductive inorganic oxide particles introduced can be increased.

When a sol in which the inorganic oxide particles having proton conductivity are stably dispersed is used as the dispersion, a solid polymer electrolyte membrane in which the inorganic oxide particles having proton conductivity are homogeneously dispersed can be obtained. When a mixed solvent of water and an alcohol is used as the dispersion medium of the sol, affinity for the resin is increased, and therefore, a solid polymer electrolyte membrane in which the inorganic oxide particles having proton conductivity are more homogeneously dispersed can be obtained. As a result, even if a fuel cell using the electrolyte membrane is subjected to a high-temperature operation or a prolonged operation, the degree of lowering of proton conductivity is low, and a high output voltage can be maintained.

After the organic resin membrane is immersed in the dispersion, the membrane is taken out, dried and then heated at a temperature in the vicinity of the softening point of the organic resin used, whereby the inorganic oxide particles having proton conductivity can be firmly fixed to the organic resin membrane. The inorganic oxide particles having proton conductivity can be fixed also by sandwiching the solid polymer electrolyte membrane between two electrode membranes after drying, and then hot pressing them.

The solid polymer electrolyte membrane can be produced also by beforehand dispersing the inorganic oxide particles having proton conductivity in a resin monomer and polymerizing the monomer. The solid polymer electrolyte membrane of the invention can be produced also by dissolving the organic resin temporarily, mixing the resin with the proton-conductive inorganic oxide particles and molding the mixture into a membrane by a conventional molding method.

In the present invention, the process comprising immersing the organic resin membrane in a dispersion of the inorganic oxide particles having proton conductivity and drying the membrane is desirable from the viewpoints of strength of the resulting membrane and production simplicity.

(Inorganic Electrolyte Membrane)

In the inorganic electrolyte membrane, the inorganic oxide particles having proton conductivity are contained in the amount of preferably 5 to 80% by weight, more preferably 30 to 75% by weight, in terms of an oxide.

If the content of the inorganic oxide particles having proton conductivity is lower than the lower limit of the above range, conductivity of the resulting membrane becomes insufficient to reduce an output voltage of a fuel cell, and an effect of use of the proton-conductive inorganic oxide particles having high water retention properties and conductivity cannot be sufficiently obtained in some cases. If the content of the inorganic oxide particles having proton conductivity is higher than the upper limit of the above range, the amount of the matrix component is small, and the strength of the resulting electrolyte membrane sometimes becomes insufficient.

To the inorganic electrolyte membrane of the invention, a component having water retention properties can be added when needed. Examples of the components having water retention properties, which are preferably employable in the invention, include porous inorganic oxides, such as silica alumina, zeolite (crystalline aluminosilicate), clay minerals and titanium nanotubes; and fine particles of inorganic compounds wherein these porous inorganic oxides or other porous inorganic compounds having high specific surface area are modified with sulfonic group, phosphoric acid group, carboxyl group or the like.

The amount of the component having water retention properties added is preferably not more than about 30% by weight.

The membrane thickness of the inorganic electrolyte membrane of the invention is in the range of preferably 0.01 to 10 mm, more preferably 0.05 to 5 mm.

If the membrane thickness of the inorganic electrolyte membrane is less than 0.01 mm, sufficient membrane strength is not obtained, and when the resulting membrane is processed, cracking takes place or pinholes are produced occasionally.

If the membrane thickness of the inorganic electrolyte membrane exceeds 10 mm, proton conductivity is lowered, and when a membrane is formed by a coating solution method, sufficient membrane strength is not obtained in some cases.

Since the inorganic electrolyte membrane comprises the inorganic matrix component and the proton-conductive inorganic oxide particles having excellent high-temperature water retention properties and conductivity as described above, a fuel cell using the inorganic electrolyte membrane can stably maintain a high output voltage even if the fuel cell is used in a prolonged operation and an operation at high temperature. That is to say, by the use of the inorganic electrolyte membrane, a fuel cell having high cell performance can be obtained.

The inorganic electrolyte membrane of the invention is usually porous and has a porosity of preferably not less than 5%, more preferably not less than 10%.

(Process for Producing Inorganic Electrolyte Membrane)

The inorganic electrolyte membrane of the invention can be produced by the use of a coating material for forming inorganic electrolyte membrane obtained by dispersing a precursor of an inorganic matrix component functioning as a binder and inorganic oxide particles having proton conductivity in a dispersion medium and if desired further dispersing fine particles of a component having water retention properties.

As the inorganic oxide particles having proton conductivity and the fine particles of a component having water retention properties, those previously described are employable.

Examples of the precursors of the inorganic matrix component include the aforesaid metallic salts and organometallic compounds of Zr, Si, Ti and Al. These metallic salts and organometallic compounds may have been hydrolyzed or partially hydrolyzed. Further, a $ZrO_2$ sol, a $SiO_2$ sol, a $TiO_2$ sol, an $Al_2O_3$ sol or a $SiO_2 \cdot Al_2O_3$ composite sol may be used, as previously described. Furthermore, a mixture of the hydrolysate and the sol may be used.

The precursor of the inorganic matrix component is preferably a silica precursor. More specifically, a silicic acid solution obtained by dealkalizing an alkali metal silicate aqueous solution, a partial hydrolysate of an organosilicon compound represented by the aforesaid formula (2), such as alkoxysilane, or a hydrolysate thereof is preferable. Examples of the alkoxysilanes include the aforesaid ones.

When at least one of the alkoxysilanes is hydrolyzed in, for example, a water/alcohol mixed solvent in the presence of an acid catalyst, a dispersion of a precursor of a matrix component containing a hydrolysis polycondensation product of the alkoxysilane is obtained. The concentration of the precursor of the matrix component in the dispersion is in the range of preferably 1 to 15% by weight, more preferably 2 to 10% by weight, in terms of an oxide.

The dispersion of the precursor of the inorganic matrix component, the inorganic oxide particles having proton conductivity, and if necessary, the fine particles of the component having water retention properties are mixed with a dispersion medium and dispersed therein to prepare a coating material for forming inorganic electrolyte membrane. The amount of each component mixed is determined so that the content of each component in the resulting inorganic electrolyte membrane should be in the aforesaid range.

The total concentration of the precursor of the inorganic matrix component, the inorganic oxide particles having proton conductivity, and if necessary, the fine particles of the component having water retention properties in the coating material for forming inorganic electrolyte membrane is in the range of preferably 2 to 50% by weight, more preferably 5 to 30% by weight, in terms of an oxide.

If the total concentration of those components in the coating material is lower than the lower limit of the above range, an inorganic electrolyte membrane having a desired thickness cannot be obtained by one coating in some cases, though it depends upon the coating method. If the total concentration of those components in the coating material is higher than the upper limit of the above range, viscosity of the resulting material becomes high, and it is difficult to use it as a coating material. Even if it can be used as a coating material, the coating method is restricted or the strength of the resulting inorganic electrolyte membrane becomes insufficient in some cases.

As the dispersion medium, water is preferable, and an organic solvent can be used in combination. Examples of the organic solvents include alcohols, such as methanol, ethanol, propanol, butanol, diacetone alcohol, furfuryl alcohol, tetrahydrofurfuryl alcohol, ethylene glycol and hexylene glycol; esters, such as methyl acetate and ethyl acetate; ethers, such as diethyl ether, ethylene glycol monomethyl ether, ethylene glycol monoethyl ether, ethylene glycol monobutyl ether, diethylene glycol monomethyl ether and diethylene glycol monoethyl ether; and ketones, such as acetone, methyl ethyl ketone, acetylacetone and acetoacetic ester.

These solvents may be used singly, or may be used as a mixture of two or more kinds.

In the present invention, the coating material may be used after it is subjected to deionization treatment or after it is concentrated or mixed with a sol when needed.

There is no specific limitation on the process for forming the inorganic electrolyte membrane using the coating material for forming inorganic electrolyte membrane, provided that the resulting membrane can have electricity-generating properties and strength, and for example, there can be mentioned a process comprising filling the coating material in a mold of good release properties, such as a mold made of Teflon (R), and then drying and heating it.

The inorganic electrolyte membrane can be formed also by a process comprising applying the coating material for forming inorganic electrolyte membrane onto an electrode of a fuel cell by spraying, roll coating, flexographic printing or the like and then drying and heating it. According to this process, an electrode and an inorganic electrolyte membrane can be produced integrally.

Further, the inorganic electrolyte membrane of the invention can be formed also by a process comprising beforehand applying a dispersion of the precursor of the inorganic matrix component to form a thin membrane comprising the inorganic matrix component, then spraying a dispersion, in which the inorganic oxide particles having proton conductivity and if necessary the fine particles of the component having water retention properties are mixed with a dispersion medium and dispersed therein, onto the thin membrane and then drying the membrane.

Fuel Cell

The fuel cell of the invention is characterized by using the above-mentioned electrolyte membrane.

More specifically, the fuel cell comprises plural layers of unit cells laminated one upon another through a cooling plate or the like. The unit cell comprises the electrolyte membrane and a pair of gas diffusion electrodes (fuel electrode and oxidizing agent electrode) arranged on both sides of the electrolyte membrane, and in the unit cell, the electrolyte membrane is sandwiched between the fuel electrode and the oxidizing agent electrode, and on the outer sides of both the electrodes, grooved collectors for forming a fuel chamber and an oxidizing agent chamber are arranged.

The gas diffusion electrode usually comprises a porous sheet in which a catalyst particle-supported conductive material is held by a hydrophobic resin binder such as PTFE. The gas diffusion electrode may be an electrode in which a catalyst particle layer is provided on an electrolyte membrane contact surface of the porous sheet comprising the conductive material and the hydrophobic resin binder such as PTFE.

The electrolyte membrane is sandwiched between a pair of the gas diffusion electrodes, and they are contact bonded by a publicly known method such as hot pressing.

The catalyst has only to be one having a catalytic action on the oxidation reaction of hydrogen and the reduction reaction of oxygen and can be selected from metals, such as platinum, ruthenium, iridium, rhodium, palladium, osmium, tungsten, lead, iron, chromium, cobalt, nickel, manganese, vanadium, molybdenum, gallium and aluminum, and alloys of these metals.

The conductive material has only to be an electronic conductive material, and for example, carbon materials, such as publicly known carbon black, specifically furnace black, channel black and acetylene black; activated carbon; graphite and various metals; are employable.

Examples of the hydrophobic resin binders include various resins containing fluorine, such as polytetrafluoroethylene (PTFE), a tetrafluoroethylene/perfluoroalkyl vinyl ether copolymer and perfluorosulfonic acid.

As the hydrophobic resin binder, a proton conductive polymer may be used. This polymer also has a function as a binder in itself and can form a matrix having sufficient stability of the catalyst particles and the conductive particles in the catalyst layer.

On an opposite surface to the surface to be in contact with the electrolyte membrane, a gas diffusion layer comprising the hydrophobic resin binder may be provided.

The amount of the catalyst supported may be in the range of preferably 0.01 to 5 mg/cm$^2$, more preferably 0.1 to 1 mg/cm$^2$, when a sheet of the catalyst layer is formed.

In order to obtain sufficient permeability, the electronic conductive porous material preferably has a specific surface area of 100 to 2000 m$^2$/g. The average pore size of the gas diffusion electrode is preferably in the range of 0.01 to 1 μm.

In the present invention, a proton conductive polymer layer may be formed on an interface between at least one of the catalyst layers and the electrolyte membrane.

In the fuel cell of the invention, hydrogen is fed to a fuel chamber, while air (oxygen) is fed to an oxidizing agent chamber, and electricity is generated through the following electrode reactions.

Fuel electrode (anode): $H_2 \rightarrow 2H^+ + 2e^-$

Oxygen electrode (cathode): $2H^+ + \frac{1}{2}O_2 + 2e^- \rightarrow 2H_2O$

It is considered that when hydrated antimony oxide particles are used as the inorganic oxide particles having proton conductivity, hydrogen is bonded to oxygen of antimony oxide skeleton or is present in a state of water or is present in a state of proton ($H^+$) or hydronium ion ($H_3O^+$), for the antimony oxide particles in the electrolyte membrane.

Gaseous water or condensed water produced by the cell reaction rapidly passes through the layer showing higher water repellency and having fine pores in the oxygen electrode by virtue of the capillary phenomenon.

EXAMPLES

The present invention is further described with reference to the following examples, but it should be construed that the invention is in no way limited to those examples.

Example 1

Antimony pentoxide particles (average particle diameter: 10 nm, $Sb_2O_5 \cdot 2.5H_2O$) as inorganic oxide particles having proton conductivity were dispersed in a mixed solvent (ethyl alcohol:water=50:50) to prepare a dispersion having a $Sb_2O_5$ concentration of 30% by weight. In this dispersion, a perfluorocarbon sulfonic acid membrane (A) (available from DuPont, Nafion membrane N-117, thickness: 183 μm) as an organic resin membrane was immersed at 50° C. for 12 hours. Then, the membrane was taken out and dried at 100° C. for 12 hours to give a solid polymer electrolyte membrane (A). The content of the antimony pentoxide particles in the solid polymer electrolyte membrane (A), which was calculated from an increase in weight, was 20% by weight.

Separately, to platinum-supported carbon particles having a platinum content of 40% by weight in terms of Pt, a mixed solvent of ethyl alcohol and water (ethyl alcohol:water=50:50) was added to give a paste. Then, the paste was applied onto two sheets of carbon paper (available from Toray Industries, Inc.), which had been subjected to water repellent treatment with tetrafluoroethylene, in such a manner that the density of the platinum-supported carbon particles on each sheet became 0.5 mg/cm$^2$, and they were dried at 100° C. for 12 hours to prepare two gas diffusion electrodes (A).

The two gas diffusion electrodes (A) were used as a positive electrode and a negative electrode. Between these electrodes, the solid polymer electrolyte membrane (A) was sandwiched, and they were hot pressed at 100° C. for 5 minutes under a pressure of 150 kg/cm$^2$ to prepare a unit cell (A) in which the gas diffusion electrodes (A) and the solid polymer electrolyte membrane (A) were joined.

(Evaluation)

The unit cell (A) was subjected to moistening treatment at 80° C. and a relative humidity of 30% for 2 hours. Then, the unit cell (A) was operated at a current density of 0.5 A/cm$^2$ for 50 hours at atmospheric pressure and a temperature of 80° C., 100° C., 120° C. or 140° C., and an output voltage at each temperature was measured.

The results are set forth in Table 1.

Example 2

A solid polymer electrolyte membrane (A) obtained in the same manner as in Example 1 was re-immersed in the antimony pentoxide particle dispersion at 50° C. for 12 hours, then taken out and dried at 100° C. for 12 hours to give a solid polymer electrolyte membrane (B). The content of the antimony pentoxide particles in the solid polymer electrolyte membrane (B), which was calculated from an increase in weight, was 35% by weight.

(Evaluation)

A unit cell (B) was prepared in the same manner as in Example 1, except that the solid polymer electrolyte membrane (B) was used. Then, output voltages were measured.

The results are set forth in Table 1.

Example 3

A solid polymer electrolyte membrane (B) obtained in the same manner as in Example 2 was re-immersed in the antimony pentoxide particle dispersion at 50° C. for 12 hours, then taken out and dried at 100° C. for 12 hours to give a solid polymer electrolyte membrane (C). The content of the antimony pentoxide particles in the solid polymer electrolyte membrane (C), which was calculated from an increase in weight, was 45% by weight.

(Evaluation)

A unit cell (C) was prepared in the same manner as in Example 1, except that the solid polymer electrolyte membrane (C) was used. Then, output voltages were measured.

The results are set forth in Table 1.

Example 4

A solid polymer electrolyte membrane (D) was obtained in the same manner as in Example 1, except that antimony pentoxide particles ($Sb_2O_5 \cdot 2.5H_2O$) having an average particle diameter of 40 nm were used. The content of the antimony pentoxide particles in the solid polymer electrolyte membrane (D), which was calculated from an increase in weight, was 15% by weight.

(Evaluation)

A unit cell (D) was prepared in the same manner as in Example 1, except that the solid polymer electrolyte membrane (D) was used. Then, output voltages were measured.

The results are set forth in Table 1.

Example 5

A solid polymer electrolyte membrane (E) was obtained in the same manner as in Example 1, except that a perfluorocarbon sulfonic acid membrane (B) (available from DuPont, Nafion membrane N-115, thickness: 127 μm) was used as an organic resin membrane. The content of the antimony pentoxide particles in the solid polymer electrolyte membrane (E), which was calculated from an increase in weight, was 25% by weight.

(Evaluation)

A unit cell (E) was prepared in the same manner as in Example 1, except that the solid polymer electrolyte membrane (E) was used. Then, output voltages were measured.

The results are set forth in Table 1.

Example 6

A solid polymer electrolyte membrane (F) was obtained in the same manner as in Example 1, except that a perfluorocarbon sulfonic acid membrane (C) (available from DuPont, Nafion membrane NE-1135, thickness: 51 μm) was used as an organic resin membrane. The content of the antimony pentoxide particles in the solid polymer electrolyte membrane (F), which was calculated from an increase in weight, was 15% by weight.

(Evaluation)

A unit cell (F) was prepared in the same manner as in Example 1, except that the solid polymer electrolyte membrane (F) was used. Then, output voltages were measured.

The results are set forth in Table 1.

Comparative Example 1

A unit cell (G) was prepared in the same manner as in Example 1, except that the perfluorocarbon sulfonic acid membrane (A) was used as a solid polymer electrolyte membrane (G) without introducing antimony pentoxide particles. Then, output voltages were measured.

The results are set forth in Table 1.

Comparative Example 2

A unit cell (H) was prepared in the same manner as in Example 1, except that the perfluorocarbon sulfonic acid membrane (B) was used as a solid polymer electrolyte membrane (H) without introducing antimony pentoxide particles. Then, output voltages were measured.

The results are set forth in Table 1.

Comparative Example 3

A unit cell (I) was prepared in the same manner as in Example 1, except that the perfluorocarbon sulfonic acid membrane (C) was used as a solid polymer electrolyte membrane (I) without introducing antimony pentoxide particles. Then, output voltages were measured.

The results are set forth in Table 1.

TABLE 1

| | Solid polymer electrolyte membrane | | | | Unit cell of fuel cell | | | |
| | | Antimony oxide particles ($Sb_2O_5 \cdot nH_2O$) | | | Cell voltage | | | |
| | Organic resin membrane | Average particle diameter (nm) | n value | Content (wt %) | 80° C. (V) | 100° C. (V) | 120° C. (V) | 140° C. (V) |
| --- | --- | --- | --- | --- | --- | --- | --- | --- |
| Ex. 1 | Nafion membrane (A) | 10 | 2.5 | 20 | 0.63 | 0.64 | 0.61 | 0.58 |
| Ex. 2 | Nafion membrane (A) | 10 | 2.5 | 35 | 0.64 | 0.66 | 0.63 | 0.6 |
| Ex. 3 | Nafion membrane (A) | 10 | 2.5 | 45 | 0.65 | 0.67 | 0.64 | 0.61 |
| Ex. 4 | Nafion membrane (A) | 40 | 2.5 | 15 | 0.62 | 0.63 | 0.59 | 0.55 |
| Ex. 5 | Nafion membrane (B) | 10 | 2.5 | 25 | 0.63 | 0.63 | 0.60 | 0.56 |
| Ex. 6 | Nafion membrane (C) | 10 | 2.5 | 15 | 0.62 | 0.61 | 0.58 | 0.53 |

TABLE 1-continued

| | | Solid polymer electrolyte membrane | | | Unit cell of fuel cell | | | |
| | | Antimony oxide particles (Sb$_2$O$_5$·nH$_2$O) | | | Cell voltage | | | |
| | Organic resin membrane | Average particle diameter (nm) | n value | Content (wt %) | 80° C. (V) | 100° C. (V) | 120° C. (V) | 140° C. (V) |
| --- | --- | --- | --- | --- | --- | --- | --- | --- |
| Comp. Ex. 1 | Nafion membrane (A) | — | — | — | 0.60 | 0.57 | 0.50 | 0.41 |
| Comp. Ex. 2 | Nafion membrane (B) | — | — | — | 0.59 | 0.55 | 0.54 | 0.38 |
| Comp. Ex. 3 | Nafion membrane (C) | — | — | — | 0.58 | 0.54 | 0.45 | 0.34 |

Example 7

Antimony pentoxide particles (average particle diameter: 10 nm, Sb$_2$O$_5$·2.5H$_2$O) as inorganic oxide particles having proton conductivity were dispersed in a mixed solvent (ethyl alcohol:water=50:50) to prepare a dispersion having a Sb$_2$O$_5$ concentration of 40% by weight. To this dispersion, Ceramate 503 (available from Catalysts & Chemicals Industries Co., Ltd., SiO$_2$ concentration: 16% by weight) obtained by hydrolysis of methyltrimethoxysilane was added as a precursor of a matrix component in such a manner that the Sb$_2$O$_5$:SiO$_2$ ratio became 50:50, and they were stirred at 50° C. for 1 hour to give a coating material (A) for forming inorganic electrolyte membrane having a total oxide concentration of 20.8% by weight.

The coating material (A) was filled in a Teflon (R) mold of 10 cm×10 cm, heated up to 250° C. at a rate of 1° C./min and maintained at 250° C. for 6 hours to give an inorganic electrolyte membrane (A). The thickness of the inorganic electrolyte membrane (A) taken out of the mold was 0.8 mm.

Separately, to platinum-supported carbon particles having a platinum content of 40% by weight in terms of Pt, a mixed solvent of ethyl alcohol and water (ethyl alcohol:water=50:50) was added to give a paste. Then, the paste was applied onto two sheets of carbon paper (available from Toray Industries, Inc.), which had been subjected to water repellent treatment with tetrafluoroethylene, in such a manner that the density of the platinum-supported carbon particles on each sheet became 0.5 g/cm$^2$, and they were dried at 100° C. for 12 hours to prepare two gas diffusion electrodes (B).

The two gas diffusion electrodes (B) were used as a positive electrode and a negative electrode. Between these electrodes, the inorganic electrolyte membrane (A) was sandwiched, and they were hot pressed at 300° C. for 4 minutes under a pressure of 20 kg/cm$^2$ to prepare a unit cell (J) in which the gas diffusion electrodes (B) and the inorganic electrolyte membrane (A) were joined.

(Evaluation)

The unit cell (J) was subjected to moistening treatment at 80° C. and a relative humidity of 30% for 2 hours. Then, the unit cell (J) was operated at a current density of 0.5 A/cm$^2$ for 50 hours at atmospheric pressure and a temperature of 80° C., 100° C., 140° C. or 180° C., and an output voltage at each temperature was measured. The results are set forth in Table 2.

Further, in order to evaluate high-temperature durability, the unit cell (J) was operated at 140° C. for 500 hours, and an output voltage was measured. The result is set forth in Table 2.

Example 8

Antimony pentoxide particles (average particle diameter: 10 nm, Sb$_2$O$_5$·2.5H$_2$O) as inorganic oxide particles having proton conductivity were dispersed in a mixed solvent (ethyl alcohol:water=50:50) to prepare a dispersion having a Sb$_2$O$_5$ concentration of 30% by weight. To this dispersion, Ceramate 503 (available from Catalysts & Chemicals Industries Co., Ltd., SiO$_2$ concentration: 16% by weight) obtained by hydrolysis of methyltrimethoxysilane and a zirconia sol (available from Daiichi Kigenso Kagaku Kogyo Co., Ltd., average particle diameter: 5 nm, ZrO$_2$ concentration: 25% by weight) were added as precursors of matrix components in such a manner that the Sb$_2$O$_5$:SiO$_2$:ZrO$_2$ ratio became 50:40:10, and they were stirred at 50° C. for 1 hour to give a coating material (B) for forming inorganic electrolyte membrane having a total oxide concentration of 21.9% by weight.

Then, a unit cell (K) was prepared in the same manner as in Example 7, except that the coating material (B) was used.

(Evaluation)

Using the unit cell (K), output voltages were measured in the same manner as in Example 7. The results are set forth in Table 2.

Example 9

Antimony pentoxide particles (average particle diameter: 10 nm, Sb$_2$O$_5$·2.5H$_2$O) as inorganic oxide particles having proton conductivity were dispersed in a mixed solvent (ethyl alcohol:water=50:50) to prepare a dispersion having a Sb$_2$O$_5$ concentration of 30% by weight. To this dispersion, Ceramate 503 (available from Catalysts & Chemicals Industries Co., Ltd., SiO$_2$ concentration: 16% by weight) obtained by hydrolysis of methyltrimethoxysilane and a silica sol (available from Catalysts & Chemicals Industries Co., Ltd., SI-350, average particle diameter: 7 nm, SiO$_2$ concentration: 20% by weight) were added as precursors of matrix components in such a manner that the Sb$_2$O$_5$:SiO$_2$:SiO$_2$ sol ratio became 70:20:10, and they were stirred at 50° C. for 1 hour to give a coating material (C) for forming inorganic electrolyte membrane having a total oxide concentration of 24.5% by weight.

Then, a unit cell (L) was prepared in the same manner as in Example 7, except that the coating material (C) was used.

(Evaluation)

Using the unit cell (L), output voltages were measured in the same manner as in Example 7. The results are set forth in Table 2.

Example 10

A unit cell (M) was prepared in the same manner as in Example 7, except that antimony pentoxide particles (Sb$_2$O$_5$·2.5H$_2$O) having an average particle diameter of 40 nm were used as inorganic oxide particles having proton conductivity.

(Evaluation)

Using the unit cell (M), output voltages were measured in the same manner as in Example 7. The results are set forth in Table 2.

Example 11

Two gas diffusion electrodes (B) were prepared in the same manner as in Example 7. With respect to one of the gas diffusion electrodes (B), the coating material (A) for forming inorganic electrolyte membrane prepared in Example 7 was applied onto a surface coated with platinum-supported carbon by a roll coating method, then dried at 100° C. for 12 hours and heated at 250° C. for 6 hours to form an inorganic electrolyte membrane (N) on the gas diffusion electrode (B). The thickness of the inorganic electrolyte membrane (N) was 0.2 nm.

Thereafter, on the inorganic electrolyte membrane (N), the other gas diffusion electrode (B) was placed, and they were hot pressed at 300° C. for 4 minutes under a pressure of 20 kg/cm$^2$ to prepare a unit cell (N) in which the gas diffusion electrodes (B) and the inorganic electrolyte membrane (N) were joined.

(Evaluation)

Using the unit cell (N), output voltages were measured in the same manner as in Example 7. The results are set forth in Table 2.

50° C. for 1 hour to prepare a coating material (O) for forming inorganic electrolyte membrane having a total oxide concentration of 23.7% by weight.

Then, a unit cell (O) was prepared in the same manner as in Example 7, except that the coating material (O) was used.

(Evaluation)

Using the unit cell (O), output voltages were measured in the same manner as in Example 7. The results are set forth in Table 2.

Comparative Example 4

Two gas diffusion electrodes (B) were prepared in the same manner as in Example 7. The two gas diffusion electrodes (B) were used as a positive electrode and a negative electrode. Between these electrodes, a perfluorocarbon sulfonic acid membrane (A) (available from DuPont, Nafion membrane N-117, thickness: 183 μm) was sandwiched, and they were hot pressed at 100° C. for 5 minutes under a pressure of 150 kg/cm$^2$ to prepare a unit cell (P) in which the gas diffusion electrodes (B) and the perfluorocarbonsulfonic acid membrane (A) were joined.

(Evaluation)

Using the unit cell (P), output voltages were measured in the same manner as in Example 7. The results are set forth in Table 2.

TABLE 2

| | Inorganic electrolyte membrane | | | | | | | Unit cell of fuel cell | | | | |
|---|---|---|---|---|---|---|---|---|---|---|---|---|
| | Antimony oxide particles | | | | | Water retentive particles | | Cell voltage | | | | Durability |
| | Average particle diameter (nm) | n value | Content (wt %) | Matrix | Content (wt %) | | Content (wt %) | 80° C. (V) | 100° C. (V) | 140° C. (V) | 180° C. (V) | 140° C./500 hr (V) |
| Ex. 7 | 10 | 2.5 | 50 | SiO$_2$ | 50 | — | — | 0.63 | 0.64 | 0.61 | 0.56 | 0.59 |
| Ex. 8 | 10 | 2.5 | 50 | SiO$_2$ ZrO$_2$ sol | 40 10 | — | — | 0.65 | 0.66 | 0.63 | 0.58 | 0.61 |
| Ex. 9 | 10 | 2.5 | 70 | SiO$_2$ SiO$_2$ sol | 20 10 | — | — | 0.66 | 0.67 | 0.64 | 0.59 | 0.63 |
| Ex. 10 | 40 | 2.5 | 50 | SiO$_2$ | 50 | — | — | 0.63 | 0.63 | 0.59 | 0.53 | 0.57 |
| Ex. 11 | 10 | 2.5 | 50 | SiO$_2$ | 50 | — | — | 0.64 | 0.65 | 0.62 | 0.57 | 0.6 |
| Ex. 12 | 10 | 2.5 | 50 | SiO$_2$ | 30 | zeolite | 20 | 0.62 | 0.61 | 0.57 | 0.51 | 0.53 |
| Comp. Ex. 4 | — | — | — | — | — | — | — | 0.61 | 0.57 | 0.26 | 0 | 0 |

Example 12

Antimony pentoxide particles (average particle diameter: 10 nm, Sb$_2$O$_5$.2.5H$_2$O) as inorganic oxide particles having proton conductivity were dispersed in a mixed solvent (ethyl alcohol:water=50:50) to prepare a dispersion having a Sb$_2$O$_5$ concentration of 30% by weight. To this dispersion, Ceramate 503 (available from Catalysts & Chemicals Industries Co., Ltd., SiO$_2$ concentration: 16% by weight) obtained by hydrolysis of methyltrimethoxysilane and a dispersion of rare earth ion-exchanged zeolite (REY, available from Catalysts & Chemicals Industries Co., Ltd., SiO$_2$/Al$_2$O$_3$=8, average particle diameter: 0.8 μm), which has a SiO$_2$.Al$_2$O$_3$ concentration of 30% by weight, were added as precursors of matrix components in such a manner that the Sb$_2$O$_5$:SiO$_2$:(SiO$_2$.Al$_2$O$_3$) ratio became 50:30:20, and they were stirred at

INDUSTRIAL APPLICABILITY

According to the present invention, the electrolyte membrane comprises an organic resin or an inorganic matrix component, and inorganic proton conductive oxide particles having excellent water retention properties at high temperature and conductivity, and therefore, a fuel cell capable of stably maintaining a high output voltage even in case of a prolonged operation and an operation at a high temperature of 100° C. or higher can be provided. Especially when an inorganic matrix component is used, a fuel cell having enhanced, excellent stability at high temperature and exhibiting high cell performance even in a prolonged operation and an operation at high temperature can be provided.

What is claimed is:

1. An electrolyte membrane comprising inorganic oxide particles having proton conductivity and a matrix component, wherein the inorganic oxide particles having proton conductivity comprise hydrated antimony oxide particles represented by the following formula (1) and have an average particle diameter of 5 to 50 nm, and the content of the hydrated antimony oxide particles is in the range of 5 to 75% by weight in terms of an oxide ($Sb_2O_5$);

$$Sb_2O_5 \cdot nH_2O \qquad (1)$$

wherein n is 0.1 to 5.

2. The electrolyte membrane as claimed in claim 1, wherein the matrix component comprises an organic resin.

3. The electrolyte membrane as claimed in claim 2, wherein the organic resin is at least one organic resin selected from the group consisting of a cation-exchange resin based on polystyrene, a mixture of fluorocarbon sulfonic acid and polyvinylidene fluoride, a graft copolymer wherein trifluoroethylene is grafted on a fluorocarbon matrix, a perfluorocarbon sulfonic acid resin, a vinylidene fluoride resin, a 2-dichloroethylene resin, a polyethylene resin, a vinyl chloride resin, an ABS resin, an AS resin, a polycarbonate resin, a polyamide resin, a polyimide resin and a methacrylic resin.

4. The electrolyte membrane as claimed in claim 1, wherein the matrix component is an inorganic matrix component.

5. The electrolyte membrane as claimed in claim 4, wherein the inorganic matrix component comprises at least one inorganic oxide selected from the group consisting of $ZrO_2$, $SiO_2$, $TiO_2$ and $Al_2O_3$.

6. A fuel cell using the electrolyte membrane of claim 1.

7. A fuel cell using the electrolyte membrane of claim 2.

8. A fuel cell using the electrolyte membrane of claim 3.

9. A fuel cell using the electrolyte membrane of claim 4.

10. A fuel cell using the electrolyte membrane of claim 5.

11. The electrolyte membrane as claimed in claim 3, wherein the organic resin is a perfluorcarbon sulfonic acid resin.

* * * * *

UNITED STATES PATENT AND TRADEMARK OFFICE
CERTIFICATE OF CORRECTION

PATENT NO. : 7,582,373 B2
APPLICATION NO. : 10/495371
DATED : September 1, 2009
INVENTOR(S) : Shirono et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1232 days.

Signed and Sealed this

Fourteenth Day of September, 2010

David J. Kappos
*Director of the United States Patent and Trademark Office*